US011443103B2

(12) United States Patent
Chan et al.

(10) Patent No.: US 11,443,103 B2
(45) Date of Patent: Sep. 13, 2022

(54) REFLOWABLE CONTENT WITH ANNOTATIONS

(71) Applicant: Rakuten Kobo Inc., Toronto (CA)

(72) Inventors: Wai Lok Chan, Toronto (CA); Ramesh Mantha, Toronto (CA); Isabelle Knott, Toronto (CA); Harry Hutton, Toronto (CA); William Chaban, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 0 days.

(21) Appl. No.: 17/495,830

(22) Filed: Oct. 7, 2021

(65) Prior Publication Data

US 2022/0108062 A1 Apr. 7, 2022

Related U.S. Application Data

(60) Provisional application No. 63/088,715, filed on Oct. 7, 2020.

(51) Int. Cl.
*G06F 17/00* (2019.01)
*G06F 40/169* (2020.01)
*G06F 3/04812* (2022.01)
*G06F 3/04842* (2022.01)

(52) U.S. Cl.
CPC ........ *G06F 40/169* (2020.01); *G06F 3/04812* (2013.01); *G06F 3/04842* (2013.01)

(58) Field of Classification Search
CPC . G06F 40/169; G06F 3/04812; G06F 3/04842
USPC ................................................. 715/230, 232
See application file for complete search history.

(56) References Cited

U.S. PATENT DOCUMENTS

| 6,687,876 | B1 * | 2/2004 | Schilit ................... G06F 40/169 |
| | | | 715/231 |
| 9,081,759 | B2 * | 7/2015 | Kan ....................... G06F 40/169 |
| 9,430,141 | B1 * | 8/2016 | Lu ......................... G06F 3/04883 |
| 10,778,928 | B2 * | 9/2020 | Li ........................... G06F 3/0304 |
| 10,817,586 | B2 * | 10/2020 | Wang .................... G06F 16/955 |
| 11,023,665 | B2 * | 6/2021 | Kochhar ............... G06F 40/197 |

(Continued)

OTHER PUBLICATIONS

Marinai, 'Reflowing and Annotating Scientific Papers on eBook Readers', ACM DocEng'13, Florence, Italy (Year: 2013).*

(Continued)

*Primary Examiner* — Stephen S Hong
*Assistant Examiner* — Matthew J Ludwig
(74) *Attorney, Agent, or Firm* — Xsensus LLP

(57) ABSTRACT

A method for annotating dynamic content includes receiving a freeform annotation overlaid on dynamic content; determining whether the dynamic content changes; in response to a determination that the dynamic content changes, displaying an indicator corresponding to a region where the freeform annotation was created; determining whether the indicator is selected; in response to a determination that the indicator is selected, displaying a lightbox with the freeform annotation as it was overlaid on the dynamic content when it was created; determining whether the a revert button included in the lightbox is selected; and in response to a determination that the revert button is selected, displaying the freeform annotation overlaid on the dynamic content as it was created before the dynamic content changed.

17 Claims, 17 Drawing Sheets

(56) References Cited

U.S. PATENT DOCUMENTS

| | | | | |
|---|---|---|---|---|
| 11,048,865 B2* | 6/2021 | Tao | | G06F 3/0484 |
| 11,074,397 B1* | 7/2021 | Lu | | G06F 3/0483 |
| 2004/0252888 A1* | 12/2004 | Bargeron | | G06F 40/171 |
| | | | | 382/188 |
| 2005/0044106 A1* | 2/2005 | Duncan | | G06V 30/32 |
| 2007/0174761 A1* | 7/2007 | Lin | | G06F 40/169 |
| | | | | 715/205 |
| 2008/0174815 A1* | 7/2008 | Komaki | | H04N 1/00214 |
| | | | | 358/1.15 |
| 2010/0278453 A1* | 11/2010 | King | | G06F 40/197 |
| | | | | 715/230 |
| 2013/0191711 A1* | 7/2013 | Tashman | | G06F 3/04883 |
| | | | | 715/252 |
| 2013/0318465 A1* | 11/2013 | Cheng | | G06F 3/0483 |
| | | | | 715/776 |
| 2014/0047322 A1* | 2/2014 | Kim | | G06F 40/143 |
| | | | | 715/234 |
| 2015/0067483 A1* | 3/2015 | Demiya | | G06F 40/171 |
| | | | | 715/249 |
| 2015/0100876 A1* | 4/2015 | Neugebauer | | G06F 3/0488 |
| | | | | 715/233 |
| 2016/0070688 A1* | 3/2016 | Yao | | G06F 40/169 |
| | | | | 715/232 |
| 2018/0253620 A1* | 9/2018 | Sharma | | G06V 10/225 |
| 2019/0220507 A1* | 7/2019 | Foss | | G06F 3/04883 |
| 2022/0019729 A1* | 1/2022 | Sharma | | G06N 20/00 |

OTHER PUBLICATIONS

Golovchinsky, Moving Markup: Reposition Freeform Annotations, UIST'02, Oct. 27-30, 2002 vol. 4, Issue 2 (Year: 2002).*

Brush, Robust Annotation Positioning in Digital Documents, SIGCHI'01, Mar. 31-Apr. 4, 2001 ACM (Year: 2001).*

* cited by examiner

200

CHAPTER II - 31 OF 47

Then, quietly, almost whispering as if wanting Gregor (whose whereabouts she did not know) to hear not even the tone of her voice, as she was convinced that he did not understand her words, she added "and by taking the furniture away, won't it seem like we're showing that we've given up all hope of improvement and we're abandoning him to cope for himself? I think it'd be best to leave the room exactly the way it was before so that when Gregor comes back to us again he'll find everything unchanged and he'll be able to forget the time in between all the easier".

Hearing these words from his mother made Gregor realise that the lack of any direct human communication, along with the monotonous life led by the family during these two months, must have made him confused - he could think of no other way of

CHAPTER II - 38 OF 58 this furniture in his room for a long time
and it would make him feel abandoned
to be in an empty room like that. Then,
quietly, almost whispering as if wanting — 225

Then, quietly, almost whispering as if
wanting Gregor (whose whereabouts she did
not know) to hear not even the tone of her
voice, as she was convinced that he did not
understand her words, she added "and by — 205
taking the furniture away, won't it seem like
we're showing that we've given up all hope
of improvement and we're abandoning him
to cope for himself? I think it'd be best to we're abandoning him to cope for — 220
himself? I think it'd be best to leave the
room exactly the way it was before so
that when Gregor comes back to us
again he'll find everything unchanged
and he'll be able to forget the time in
between all the easier".

CHAPTER II · 38 OF 58 this furniture in his room for a long time and it would make him feel abandoned to be in an empty room like that. Then, quietly, almost whispering as if wanting Gregor (whose whereabouts she did not know) to hear not even the tone of her voice, as she was convinced that he did not understand her words, she added "and by taking the furniture away, won't it seem like we're showing that we've given up all hope of improvement and we're abandoning him to cope for himself? I think it'd be best to leave the room exactly the way it was before so that when Gregor comes back to us again he'll find everything unchanged and he'll be able to forget the time in between all the easier".

CHAPTER II - 38 OF 58 this furniture in his room for a long time and it would make him feel abandoned to be in an empty room like that. Then, quietly, almost whispering as if wanting Gregor know voic not "and it se give we're abandoning him to cope for himself? I think it'd be best to leave the room exactly the way it was before so that when Gregor comes back to us again he'll find everything unchanged and he'll be able to forget the time in between all the easier".

Then, quietly, almost whispering as if wanting Gregor (whose whereabouts she did not know) to hear not even the tone of her voice, as she was convinced that he did not understand her words, she added "and by taking the furniture away, won't it seem like we're showing that we've given up all hope of improvement and we're abandoning him to cope for himself? I think it'd be best to

CHAPTER 8 - 31 OF 47

Then, quietly, almost whispering as if wanting Gregor (whose whereabouts she did not know) to hear not even the tone of her voice, as she was convinced that he did not understand her words, she added "and by taking the furniture away, won't it seem like we're showing that we've given up all hope of improvement and we're abandoning him to cope for himself? I think it'd be best to leave the room exactly the way it was before so that when Gregor comes back to us again he'll find everything unchanged and he'll be able to forget the time in between all the easier".

Hearing these words from his mother made Gregor realise that the lack of any direct human communication, along with the monotonous life led by the family during these two months, must have made him confused - he could think of no other way of

REFLOWABLE CONTENT WITH ANNOTATIONS

CROSS-REFERENCE TO RELATED APPLICATION

This application claims the benefit of U.S. Provisional Application No. 63/088,715, filed Oct. 7, 2020, which is incorporated herein by reference in its entirety.

BACKGROUND

Typically, annotations made on dynamic content as opposed to content having a fixed layout are lost when the dynamic content is adjusted. Currently, the few annotations that can be maintained with dynamic content are limited and have a predetermined structure (e.g., dog ear a page of an e-book). However, as most content displayed on electronic devices is dynamic (e.g., content with adjustable text and/or images), typical electronic devices have limited options, if any, for maintaining less structured annotations after dynamic content is changed.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, a method for annotating dynamic content includes receiving a freeform annotation overlaid on dynamic content; determining whether the dynamic content changes; in response to a determination that the dynamic content changes, displaying an indicator corresponding to a region where the freeform annotation was created; determining whether the indicator is selected; in response to a determination that the indicator is selected, displaying a lightbox with the freeform annotation as it was overlaid on the dynamic content when it was created; determining whether a revert button included in the lightbox is selected; and in response to a determination that the revert button is selected, displaying the freeform annotation overlaid on the dynamic content as it was created before the dynamic content changed.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A illustrates an e-reader displaying a reflowable electronic publication (e-pub) according to one or more aspects of the disclosed subject matter;

FIG. 2D illustrates an e-reader displaying a first display box according to one or more aspects of the disclosed subject matter;

FIG. 2E illustrates an e-reader displaying a second annotation according to one or more aspects of the disclosed subject matter;

FIG. 2F illustrates an e-reader displaying the first annotation via the first display box and the second annotation according to one or more aspects of the disclosed subject matter;

FIG. 2G illustrates an e-reader displaying a second bracket indicating a region where an annotation was created according to one or more aspects of the disclosed subject matter;

FIG. 2H illustrates an e-reader displaying a second display box according to one or more aspects of the disclosed subject matter;

DETAILED DESCRIPTION

Figure 1:
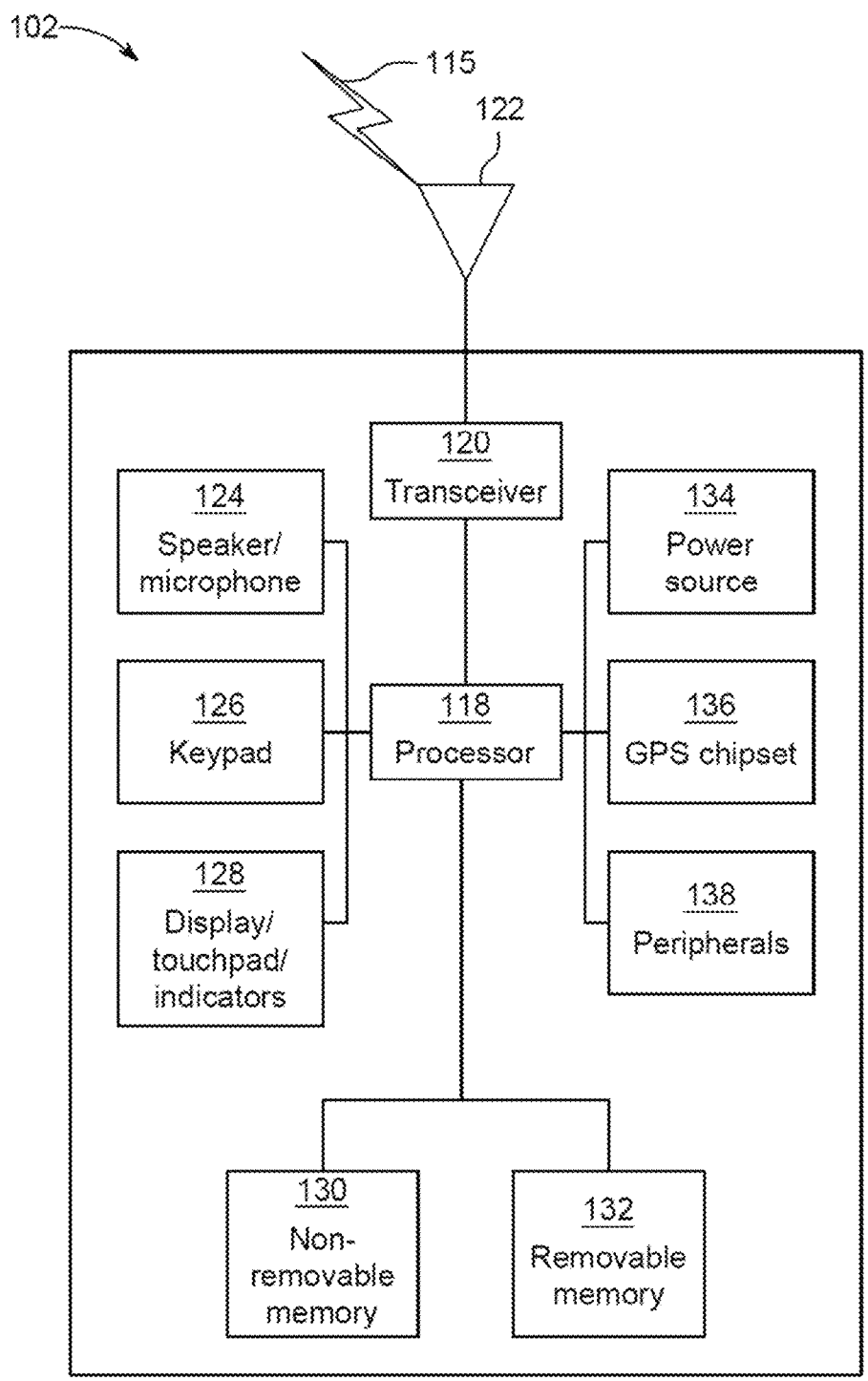
FIG. 1 is a block diagram of an electronic device according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views:

FIG. 1 is a block diagram of an exemplary electronic device 102 that may be configured for displaying content in accordance with the systems, methods, and apparatuses described herein. For example, the electronic device 102 can be an e-reader, smartphone, tablet, laptop, computer, server, PDA, and the like. As shown in FIG. 1, the electronic device 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the electronic device 102 may include any sub-combination of the foregoing elements.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the electronic device 102 to operate as further described herein. The processor 118 may be coupled to the transceiver 120, which may be coupled to the transmit/receive element 122. While FIG. 1 depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, other electronic devices over a network 115. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

The network 115 can be a public network, such as the Internet, or a private network, such as an LAN or WAN network, or any combination thereof and can also include PSTN or ISDN sub-networks. The network 115 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known.

In addition, although the transmit/receive element 122 is depicted in FIG. 1 as a single element, the electronic device 102 may include any number of transmit/receive elements 122. More specifically, the electronic device 102 may employ MIMO technology. Thus, the electronic device 102 may include two or more transmit/receive elements 122 (e.g., multiple antennas) for transmitting and receiving wireless signals over the air interface 115.

The transceiver 120 may be configured to modulate the signals that are to be transmitted by the transmit/receive element 122 and to demodulate the signals that are received by the transmit/receive element 122. As noted above, the electronic device 102 may have multi-mode capabilities. Thus, the transceiver 120 may include multiple transceivers for enabling the electronic device 102 to communicate via multiple RATs, for example NR and IEEE 802.11 or NR and E-UTRA, or to communicate with the same RAT via multiple beams to different RRHs, TRPs, RSUs, or nodes.

The processor 118 of the electronic device 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the electronic device 102, such as on a server that is hosted in the cloud or in an edge computing platform or in a home computer (not shown).

The processor 118 may receive power from the power source 134, and may be configured to distribute and/or control the power to the other components in the electronic device 102. The power source 134 may be any suitable device for powering the electronic device 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the electronic device 102. It will be appreciated that the electronic device 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The electronic device 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The electronic device 102 may connect to other components, modules, or systems of such apparatuses or devices via one or more interconnect interfaces, such as an interconnect interface that may comprise one of the peripherals 138.

Generally, the electronic device 102 can be configured to display content. For example, the electronic device 102 can display any text and/or image source (e.g., html, reflowable electronic publications, websites, pdf, etc.) that can be adjusted (e.g., margins, spacing, font size, image size, etc.). Further, the electronic device 102 can be configured to receive user input. In one aspect, a user can create any overlay they choose on top of the original content. For example, the user can create an overlay corresponding to one or more of a sketch, drawing, annotation, shape (e.g., circle, box, etc. that are hand drawn and/or generated with the assistance of the electronic device 102), underline, highlight, and the like on the original content. In one aspect, the overlay is a freeform overlay. Additionally, it should be appreciated that "original content" in this context can refer to the current adjustments (e.g., margins, spacing, font size, image size, etc.) displayed by the electronic device 102. As will be further described herein, a user can generate an overlay on a first original content, make an adjustment to the text and/or image source, then generate an overlay on a second original content (i.e., the content displayed after the adjustment). In other words, each overlay can be associated with the content that is being displayed when the overlay is generated. It should be appreciated that "annotation" can be interchangeable with "overlay" for purposes of the description for ease of understanding. However, "annotation" is exemplary and not intended to be limiting. In other words, the annotation can include one or more of a sketch, drawing, words, shapes, underlines, highlights, and the like.

After creating an overlay on the original content, the user can freely adjust the original displayed content. Once adjusted, the electronic device 102 can be configured to display brackets that indicate the region where the overlay (e.g., annotation) was created. Any further adjustments to the original text can also allow further annotations (e.g., multiple layers). Additionally, by selecting (e.g., receiving user input) the bracket area, the electronic device 102 can be configured to display a display box (e.g., a lightbox) including an image of the original annotation. The display box can also include a revert button that allows the user to view the displayed content in its original state (i.e., the state in which the overlay was created). In one aspect, a numbering system can be used to indicate a number of annotations in the specified annotated regions (e.g., annotations icon with number). Accordingly, all annotations can then be designed to be viewed/edited in their corresponding section (e.g., an annotations view). It should be appreciated that the processes described herein can apply to any reflowable content. Reflowable content includes ePub, txt, HTML, MOBI, and FB2 files, and the like. For example, reader software may allow the user to change certain parameters like font size and screen size, and the reader software will choose word placements that best suit those parameters (e.g., reflow). As further described herein, reflow can refer to the software (e.g., reader software) choosing screen placements for words, images, and other components for the reflowable content (e.g., reflowable eBook). In one aspect, reader software can refer to software that renders an eBook for a user, which includes desktop reader software, web browsers, dedicated eInk devices, mobile phone apps that render eBooks, and the like.

Figure 8:
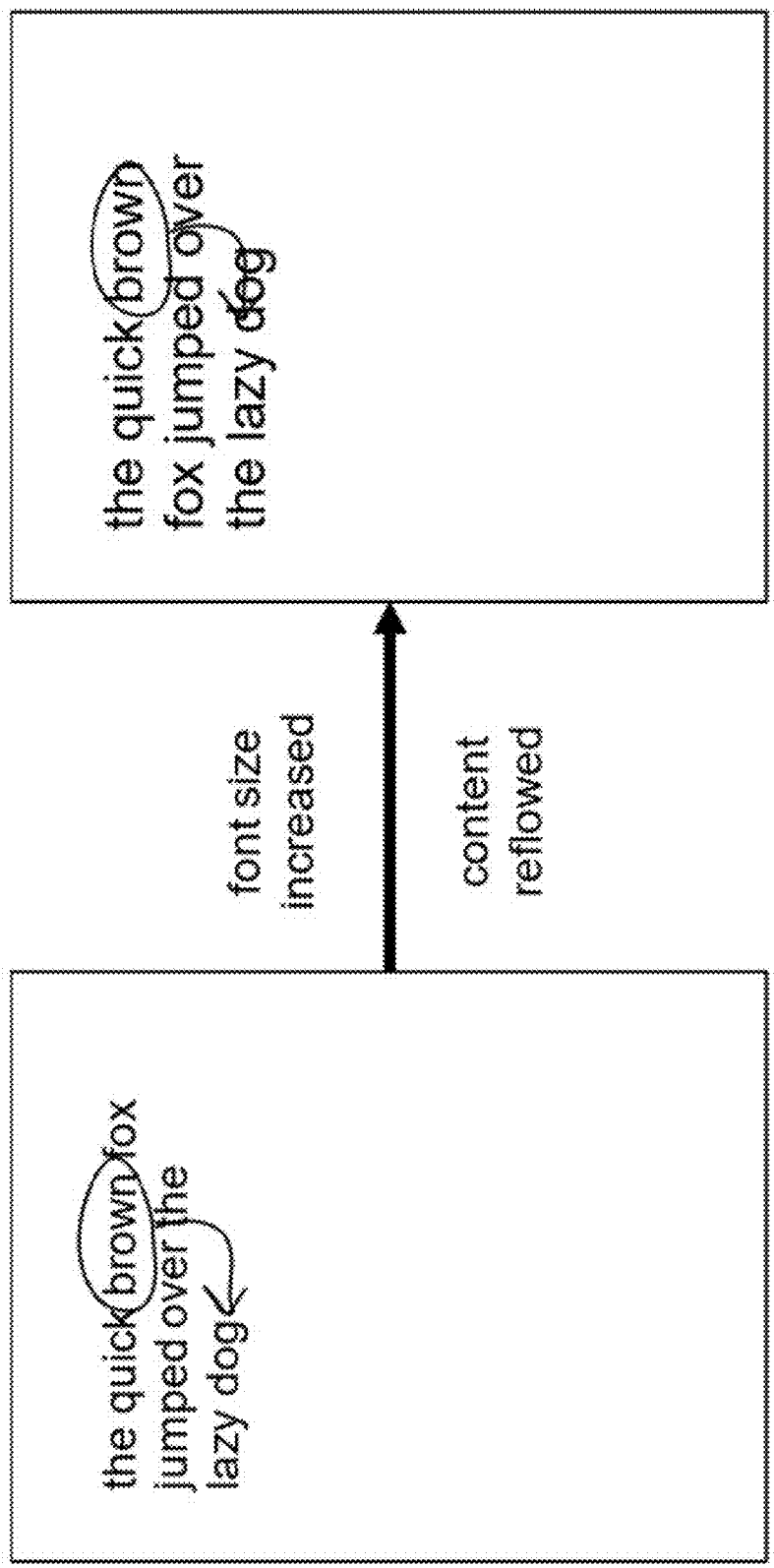
FIG. 8 illustrates an example of a misinterpretation of a semantic relationship between an annotation and the underlying words after content is reflowed according to one or more aspects of the disclosed subject matter.

More specifically, the present disclosure describes how, where, and if to display an annotation (e.g., a stylus drawing made overtop reflowable content) because a user created annotation can have a semantic relationship with the reflowed content. For example, referring to FIG. 8, a user has circled the word "brown" and added an arrow leading from the circle to the word "dog." If the user increases the font size and the reader software computes a new reflow for the content, these words will be in different places. If the circle is moved to match the location of the word "brown", then the arrow will no longer line up with the word "dog." No amount of linear transformation can place the markup in a location that maintains the original intent of the user. As further described herein, the electronic device 102 can be configured to both save an annotation when a user makes an annotation and defines how, where, and if that markup should be displayed given the reflow computed by the reader software.

FIGS. 2A-2H illustrate the process using an e-reader and a reflowable e-pub as a non-limiting example.

Figure 2B:
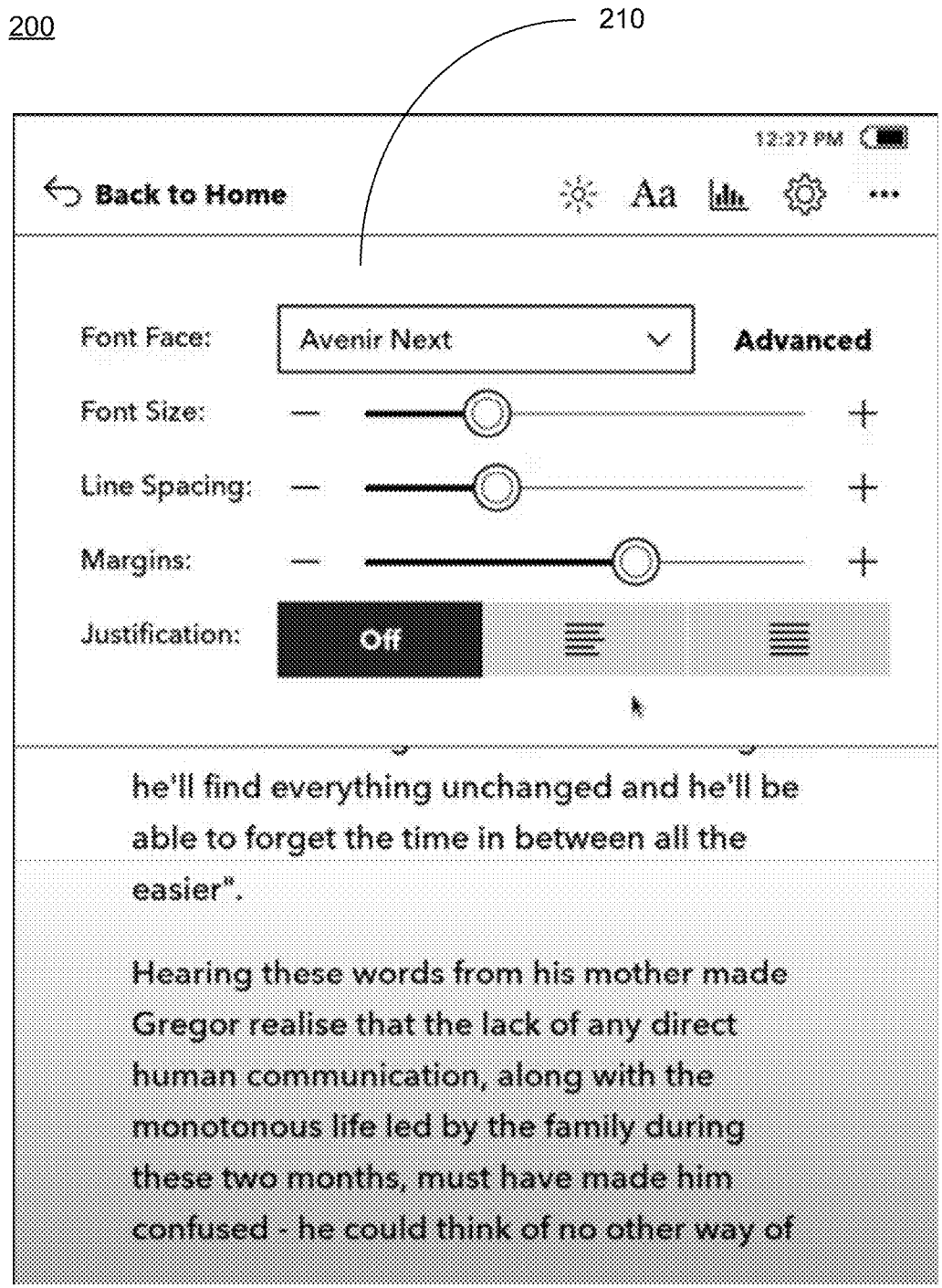
FIG. 2B illustrates an e-reader displaying an adjustment menu according to one or more aspects of the disclosed subject matter.

FIG. 2A illustrates an e-reader 200 displaying a reflowable electronic publication (e-pub) according to one or more aspects of the disclosed subject matter. In one aspect, the e-reader 200 can be an example of the electronic device 102. FIGS. 2A-2H can correspond to an example of receiving one or more annotations and maintaining the one or more annotations throughout one or more adjustments to the reflowable text and/or images. In one aspect, the e-reader 200 can uniquely identify how a range of text was "broken" across lines by the reading software's reflow algorithm. It should be appreciated that this unique identification can be referred to herein as "fingerprinting." For example, a fingerprint can have the property that when a range of text is reflowed in a new way, its fingerprint will match its previous fingerprint if and only if the number of characters on each line is identical. In other words, the fingerprint can be represented as a sequence of numbers, where each number corresponds to the number of characters on that line. However, a fingerprint may also be represented differently (e.g., a specific range of characters). Additionally, a fingerprint can be implemented as a cryptographic hash, or as a copy of the eBook's text with newline characters inserted to match the reflow algorithm's line breaks, for example.

More specifically, FIG. 2A illustrates a first annotation 205 on a reflowable e-pub. The first annotation 205 is a free form (e.g., hand drawn) box surrounding three lines of text. However, the first annotation 205 is exemplary as the first annotation 205 could also include one or more additional annotations and each annotation could be one or more of a sketch, drawing, words, shapes, underlines, highlights, and the like. Additionally, any annotations can be generated by hand and/or with the assistance of the electronic device 102 (e.g., e-reader 200). In other words, any annotations generated by hand can correspond to receiving user input via a stylus, mouse, finger, and the like corresponding to the user "drawing" a shape, drawing, underline, written text, etc. on the display of the electronic device 102. Additionally, the annotations generated with the assistance of the electronic device 102 can correspond to various software tools that can assist a user in generating shapes (e.g., boxes, ellipses, etc.), underlines, highlights, text boxes, etc. Accordingly, it should be appreciated that reference herein to annotations can include free form annotations generated by hand by the user and/or annotations generated with assistance.

FIG. 2B illustrates an e-reader 200 displaying an adjustment menu 210 according to one or more aspects of the disclosed subject matter. For example, the adjustment menu 210 can adjust the font, font size, line spacing, margins, and/or justification of the text in response to user input, and the reflowable e-pub can reflow the text accordingly (e.g., as shown in FIG. 2C).

Figure 2C:
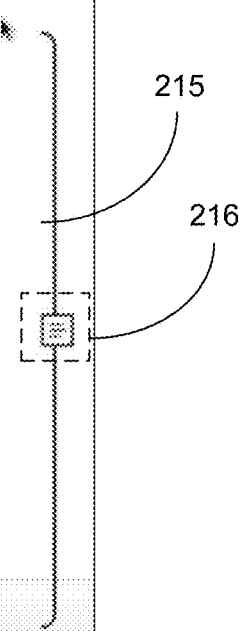
FIG. 2C illustrates an e-reader displaying a first bracket indicating a region where an annotation was created according to one or more aspects of the disclosed subject matter.

FIG. 2C illustrates an e-reader 200 displaying a first bracket 215 indicating a region where an annotation (e.g., the first annotation 205) was created according to one or more aspects of the disclosed subject matter. For example, the first bracket 215 identifies a region where the first annotation 205 was created before the text was reflowed. As a result, the user can still access their annotation even after the text was reflowed in response to an adjustment received via the adjustment menu 210, for example. In one aspect, the first bracket 215 can also include an icon 216. The bracket and/or the icon can be selected to display additional information. It should be appreciated that reference to selecting the bracket can refer to selection (e.g., click, stylus touch, finger press, etc.) of the bracket and/or the icon.

FIG. 2D illustrates an e-reader 200 displaying a first display box 220 according to one or more aspects of the disclosed subject matter. In one aspect, the first display box 220 can be a lightbox. The first display box 220 can display an image of the first annotation 205 on the original content (i.e., before the reflow). Accordingly, the user can view their annotation exactly as the user annotated the content even after the reflow. Additionally, the first display box 220 can include a first revert button 225. In response to selection of the reflow button 225, the content can revert to displaying the content as it was displayed before receiving the adjustment via the adjustment menu 210. In other words, in response to selection of the first revert button 225, the content can be displayed as it was before the reflow, including the user's annotation on the original content.

FIG. 2E illustrates an e-reader 200 displaying a second annotation 230 according to one or more aspects of the disclosed subject matter. Here, the second annotation 230 is on a different layer than the first annotation 205. For example, the second annotation 230 is received on displayed content with different adjustment settings (e.g., different font size) relative to the displayed content on which the first annotation 205 was received. In other words, the user generated the second annotation 230 after the text was reflowed. As a result, the first annotation 205 is in a region indicated by the first bracket 215, and the second annotation 230 is displayed on the reflowed text.

Additionally, in one aspect, a user may annotate on top of a bracketed region. In this case, in response to the text being reflowed, the annotation bracket region can be expanded and an extra icon (e.g., icon 216) can be added and/or a numbering of the annotations in that bracket can be added, for example, to distinguish between the annotations.

FIG. 2F illustrates an e-reader 200 displaying the first annotation 205 via the first display box 220 and the second annotation 230 according to one or more aspects of the disclosed subject matter. For example, by selecting the first revert button 225, the user can switch between the original content and the reflowed content.

FIG. 2G illustrates an e-reader 200 displaying a second bracket 235 indicating a region where an annotation (e.g., the second annotation 230) was created according to one or more aspects of the disclosed subject matter. For example, the second bracket 235 identifies a region where the second annotation 230 was created before the text was reverted to the original content. In other words, the text is reflowed to revert to the original content (e.g., the original adjustment setting of the adjustment menu 210 before the text was reflowed). Even though it is a reversion to the "original content," the text is still reflowed, which triggers the second bracket 235 to indicate the region where the second annotation 230 was created. As a result, the user can switch between the two reflows by selecting the corresponding revert button. It should be appreciated that if the displayed content was adjusted to settings different than the original content and the reflowed content containing the second annotation 230, another layer (e.g., a third layer) can be created in the same way the second layer was created to maintain the annotation.

Figure 2H:
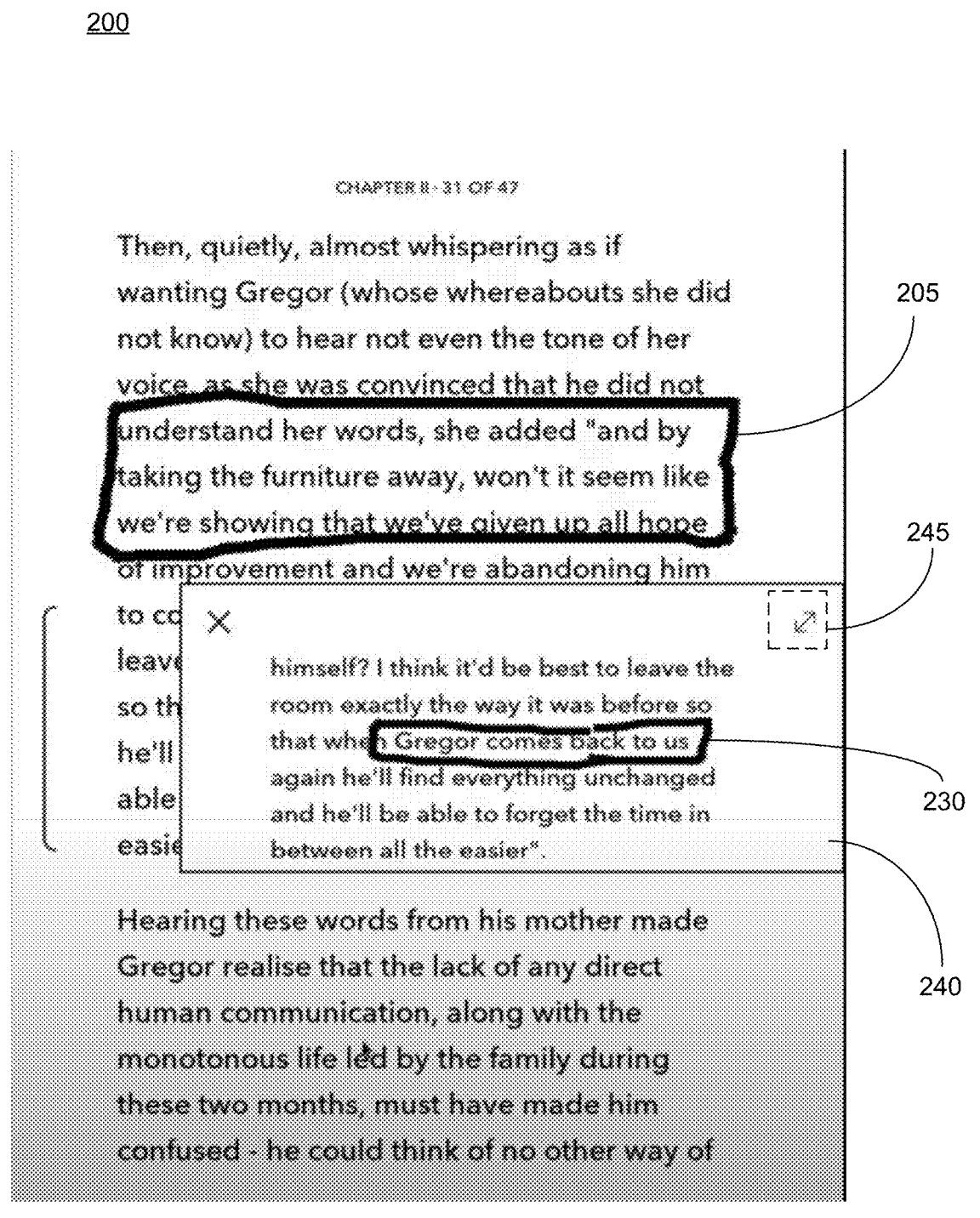

FIG. 2H illustrates an e-reader 200 displaying a second display box 240 according to one or more aspects of the disclosed subject matter. In one aspect, the display box 240 can be a lightbox. For example, if the user has reverted to the original content by selecting the first revert button 225 (e.g., the user sees FIG. 2G), the user can select (e.g., click, press, touch, etc.) the second bracket 235 to display the second display box 240. The second display box 240 can show an image of the second annotation 230. Additionally, the second display box 240 can include a second revert button 245. The second revert button 245 can reflow the text so that the second annotation 230 is displayed as it was originally annotated by the user. As a result, the user would see FIG. 2E where the first bracket 215 indicates the region where the first annotation 205 was created and shows the second annotation 230 (and the associated displayed content) as it was originally created by the user.

It should be appreciated that reference to an e-reader and reflowable e-pub in FIGS. 2A-2H are exemplary and the same could be applied to other electronic devices displaying dynamic content.

Figure 3:
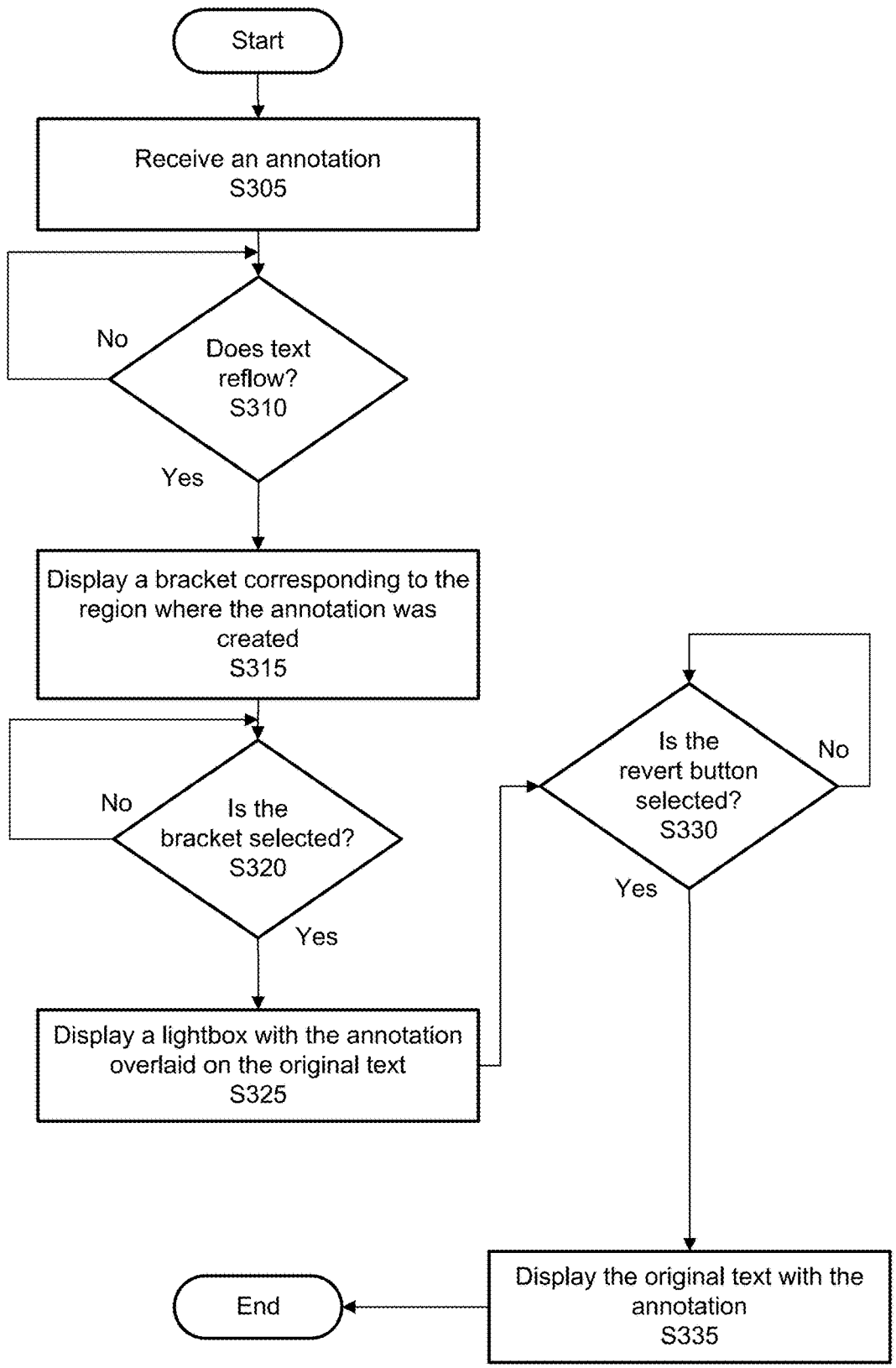
FIG. 3 is an algorithmic flow chart of a method for maintaining annotations with reflowable content according to one or more aspects of the disclosed subject matter.

FIG. 3 is an algorithmic flow chart of a method for maintaining annotations with reflowable content according to one or more aspects of the disclosed subject matter.

In S305, the electronic device 102 can be configured to receive an annotation. For example, the annotation can be a freeform annotation on the page displayed via the electronic device 102 (e.g., overlaid on the text and/or in the margins). In one aspect, S305 can correspond to FIG. 2A. In one aspect, FIG. 4 describes how the annotation is associated with the text on the page displayed via the electronic device 102. In one aspect, FIG. 9 and the corresponding description can alternatively, or in addition to FIG. 4, describe how the annotation is associated with the text on the page displayed via the electronic device 102.

In S310, the electronic device 102 can be configured to determine whether the displayed content has changed. For example, the displayed content can be dynamic content and the electronic device 102 can be configured to determine whether the displayed content (e.g., text) is dynamically changed (e.g., reflowed) in response to a change in font size. If the displayed content is not changed, the process can continue to check for any change to the displayed content. However, if it is determined that the displayed content has changed (e.g., triggering reflowed text), a bracket corresponding to the region where the annotation was created can be displayed in S315. In one aspect, S310 can correspond to an adjustment via the adjustment menu in FIG. 2B.

In S315, the electronic device 102 can display a bracket (e.g., first bracket 215, second bracket 235) that indicates the region where the annotation was created. Although the text is a different position after the adjustment (e.g., change in font size), the area where the annotation was created is still identified by the bracket. In one aspect, the bracket can also include an icon in combination with the bracket. The bracket and/or the icon can act as a button to display additional information in response to the bracket and/or the icon being selected. In one aspect, S315 can correspond to FIG. 2C.

In S320, the electronic device 102 can determine whether the bracket is selected. For example, the user can select the bracket (e.g., via click, stylus touch, finger press, etc.) to display additional information. If it is determined that the bracket is not selected, the process can continue checking to see if the bracket is selected. However, if it is determined that the bracket is selected, a lightbox can be displayed in S325.

In S325, the electronic device 102 can be configured to display a lightbox with the annotation overlaid on the original text in response to the user selecting the bracket in S320. For example, the original text can correspond to the text before the reflow, a portion of which is displayed in the lightbox with the original annotation overlaid on it. In one aspect, S325 can correspond to FIG. 2D.

In S330, the electronic device 102 can determine whether the revert button is selected. For example, the lightbox displayed in S325 can include a revert button. In response to selecting the revert button, the text can be displayed as it was before the reflow. For example, if the text was in a "default" setting before the reflow, then the text can revert to the default settings and the freeform annotation will be overlaid on the text and/or in the margins just as it was originally created by the user. Accordingly, if it is determined that the revert button is not selected, the process can continue to check if the revert button is selected. However, if it is determined that the revert button is selected, the original text with the annotation can be displayed in S335.

In S335, the electronic device 102 can be configured to display the original text with the annotation in response to the user selecting the revert button in S330. For example, the original text can correspond to the text before the reflow. In other words, whatever the current settings of the displayed content were (e.g., font, font size, margin width, etc.) when the annotation was created are reverted to in response to the user selecting the revert button. Additionally, the annotation is overlaid on the text and/or in the margin exactly was it was displayed when the user created that annotation. In one aspect, S335 can correspond to FIG. 2G. After displaying the original text with the annotation in S335, the process can end.

Figure 4:
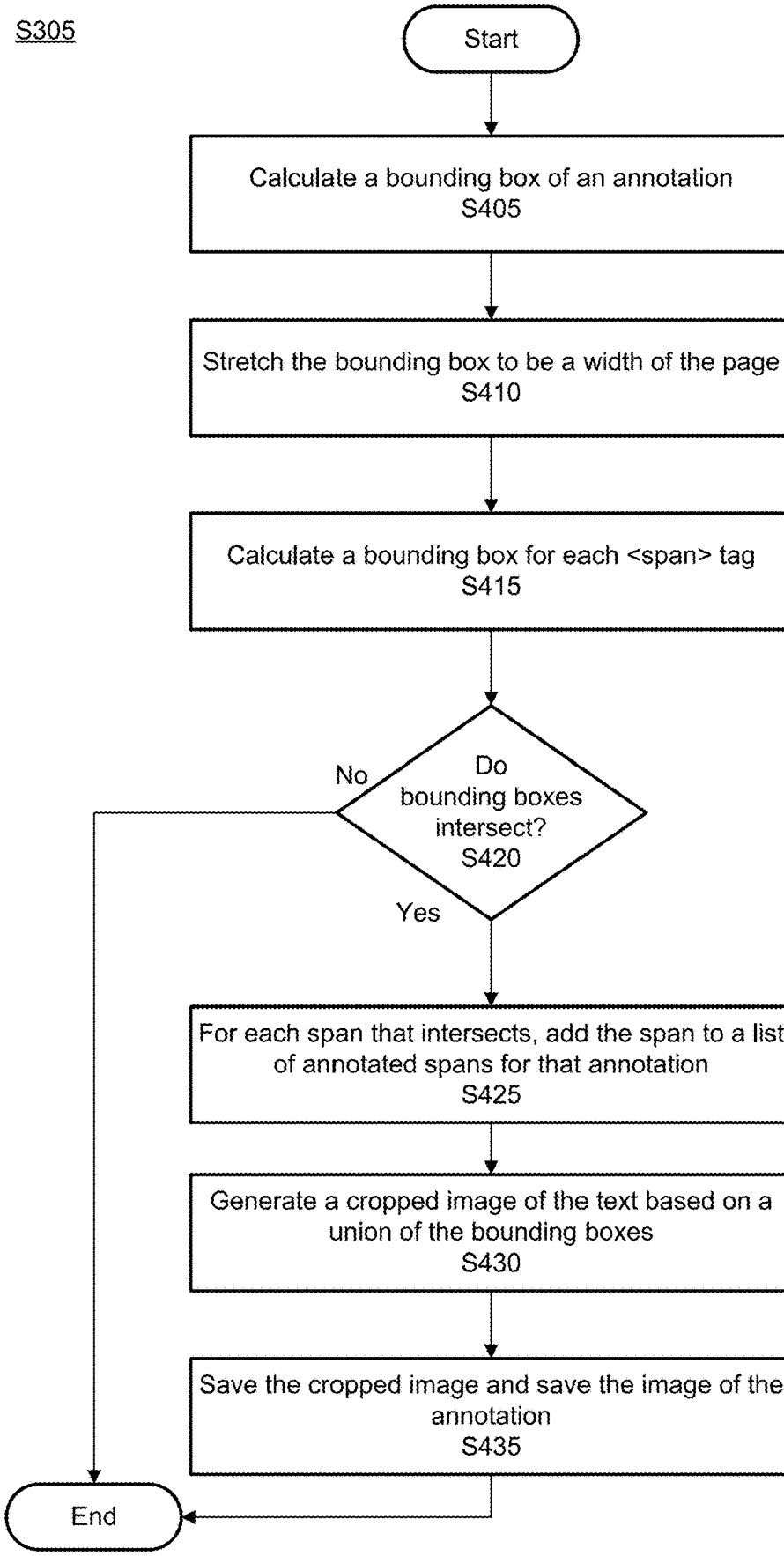
FIG. 4 is an algorithmic flow chart of a method for capturing text associated with an annotation according to one or more aspects of the disclosed subject matter.

FIG. 4 is an algorithmic flow chart of a method for capturing text associated with an annotation according to one or more aspects of the disclosed subject matter. In one aspect, FIG. 4 can correspond to S305 in FIG. 3.

In S405, the electronic device 102 can be configured to calculate a bounding box of an annotation (e.g., the annotation received in S305).

In S410, after calculating the bounding box of the annotation, the electronic device 102 can be configured to stretch the bounding box to be the width of the page.

In S415, the electronic device 102 can be configured to calculate a bounding box for each <span> tag, for example. In one aspect, the <span> tags can be added around each sentence of an e-pub, and each span can be iterated through (e.g., each span in the chapter in which the annotation was received) so that a bounding box is calculated for each span. Alternatively, or additionally, the bounding box can be calculated for any kind of reflowable element in a document. For example, the reflowable element can be a sentence, a paragraph, an image, or even individual glyphs. After the bounding boxes are calculated, they can be used to associate the annotation with those reflowable elements if the element's bounding box and the annotation's bounding box intersects. In other words, calculating the bounding box for each <span> tag in S415 (and corresponding references to span tags herein) is simply exemplary as the bounding box for any kind of reflowable element in a document can be calculated and used for the same.

Alternatively, or additionally, the bounding box of each glyph as it appears on screen can be calculated, and the union of those bounding boxes can be taken to form the bounding box for a sentence or paragraph.

In S420, the electronic device 102 can be configured to determine whether any of the bounding boxes calculated for each span intersect with the bounding box for the annotation. If it is determined that none of the bounding boxes intersect, the process can end. However, if it is determined that a bounding box of a span intersects with the bounding box of the annotation, the span can be added to a list of annotated spans for that annotation in S425.

Alternatively, in one aspect, if it is determined that none of the bounding boxes intersect, rather than the process ending, the closest element to the center of the annotation's bounding box can be selected. Alternatively, in one aspect, the union of all elements on the page can be selected. Alternatively, in one aspect, an arbitrary choice of element to associated with the annotation can be selected.

In S425, for each span that intersects, the span can be added to a list of annotated spans for that annotation.

In S430, the electronic device 102 can be configured to generate a cropped image of the text based on a union of the bounding boxes. In other words, the electronic device 102 can be configured to take the union of all the bounding boxes, including the bounding box of the annotation, and crop the text of the page based on the union of the all the bounding boxes. In one aspect, the cropped text can be a rectangle outlining the combined bounding boxes.

In S435, the electronic device 102 can be configured to save the cropped text as an image and save the annotation as an image. After saving the cropped text and the annotation as images, the process can end.

Figure 5:
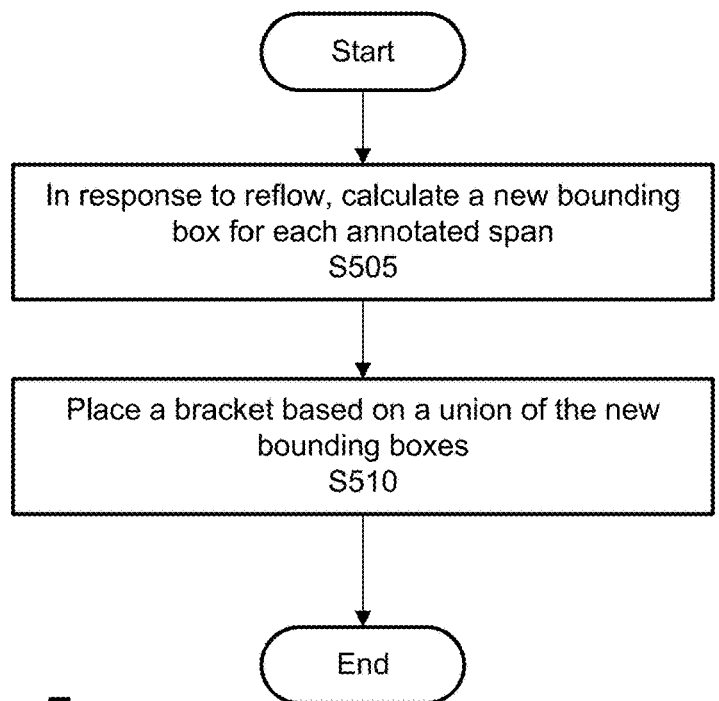
FIG. 5 is an algorithmic flow chart of a method for identifying a region where an annotation was created after text is reflowed according to one or more aspects of the disclosed subject matter.

FIG. 5 is an algorithmic flow chart of a method for identifying a region where an annotation was created after text is reflowed according to one or more aspects of the disclosed subject matter. In one aspect, FIG. 5 can correspond to S315 in FIG. 3.

In S505, in response to text reflow, the electronic device 102 can be configured to calculate a new bounding box for each annotated span (e.g., each span added to the list of annotated spans for that annotation in S425).

In S510, the electronic device 102 can be configured to place an indicator (e.g., a bracket) based on a union of the new bounding boxes. In other words, the bracket is placed to identify the area were the annotation was created, and the area can be identified based on the list of spans that intersected with the original annotation. After placing the bracket, the process can end.

Figure 6:
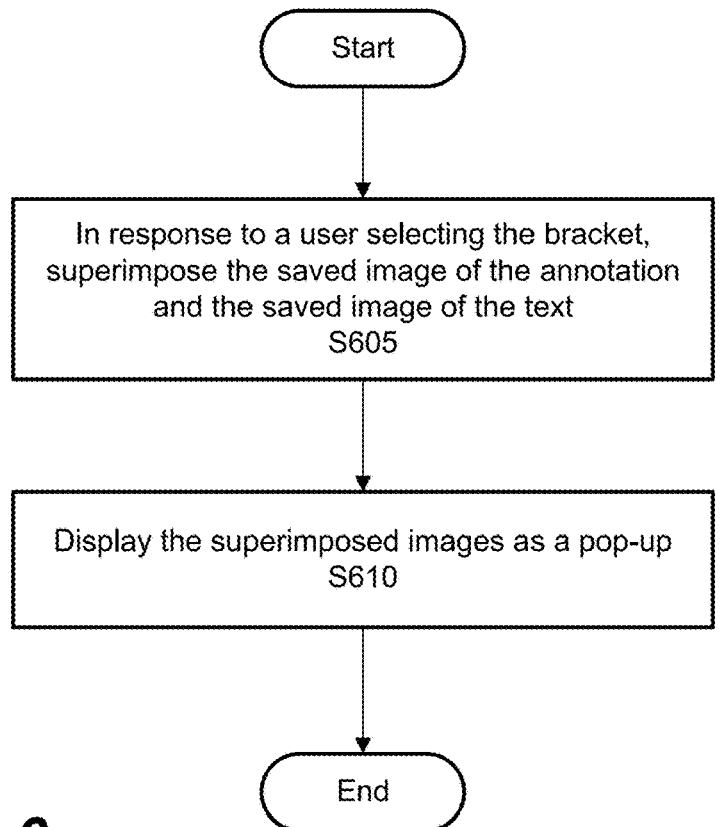
FIG. 6 is an algorithmic flow chart of a method for displaying a pop-up of the annotation superimposed on the original text according to one or more aspects of the disclosed subject matter.

FIG. 6 is an algorithmic flow chart of a method for displaying a pop-up of the annotation superimposed on the original text according to one or more aspects of the disclosed subject matter. In one aspect, FIG. 6 can correspond to S325 in FIG. 3.

In S605, in response to a user selecting the bracket (or an icon associated with the bracket as has been further described herein), the electronic device 102 can be configured to superimpose the saved image of the annotation and the saved image of the text (e.g., the images saved in S435).

In S610, the electronic device 102 can be configured to display the superimposed images. In one aspect, the superimposed images can be displayed as a pop up. A non-limiting example of the superimposed images displayed as a pop up can correspond to the first display box 220 in FIG. 2D. After displaying the superimposed images, the process can end.

Additionally, it should be appreciated that portions of the algorithmic flow charts in FIGS. 3-6 can be repeated to maintain more than one annotation per layer, as well as maintaining annotations on different layers. In other words, the electronic device 102 can be configured to receive an additional annotation on the reflowed text (e.g., different layer than the first annotation received on the "original" text). The additional annotation can also display a bracket indicating the region where the additional annotation was created and display a lightbox with a revert button in response to a user selecting the bracket (e.g., FIG. 2E and FIG. 2F). By selecting the revert buttons for annotations corresponding to the different layers, the user can switch between layers to view the annotations overlaid on the text and/or in the margins as they were when the user created them.

Additionally, although FIGS. 2A-2G and FIGS. 3-6 reference an example of an e-reader with a reflowable e-pub, the steps of the process described can similarly be applied to any electronic device displaying dynamic content (e.g., reflowable content). In one aspect, reflowable content can include ePub, txt, HTML, MOBI, FB2 files, and the like. For example, the process can similarly be applied to a website displaying text and/or images. A user can annotate the text and/or images on the website and if the text and/or images are adjusted, the steps of the process described herein can maintain the annotations with the adjusted text and/or images and also revert to the originally displayed content as has been described herein.

In the description herein of FIGS. 3-6 and 10, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another or may be combined in various ways. All possible combinations and sub-combinations are intended to fall within the scope of this disclosure.

Figure 7:
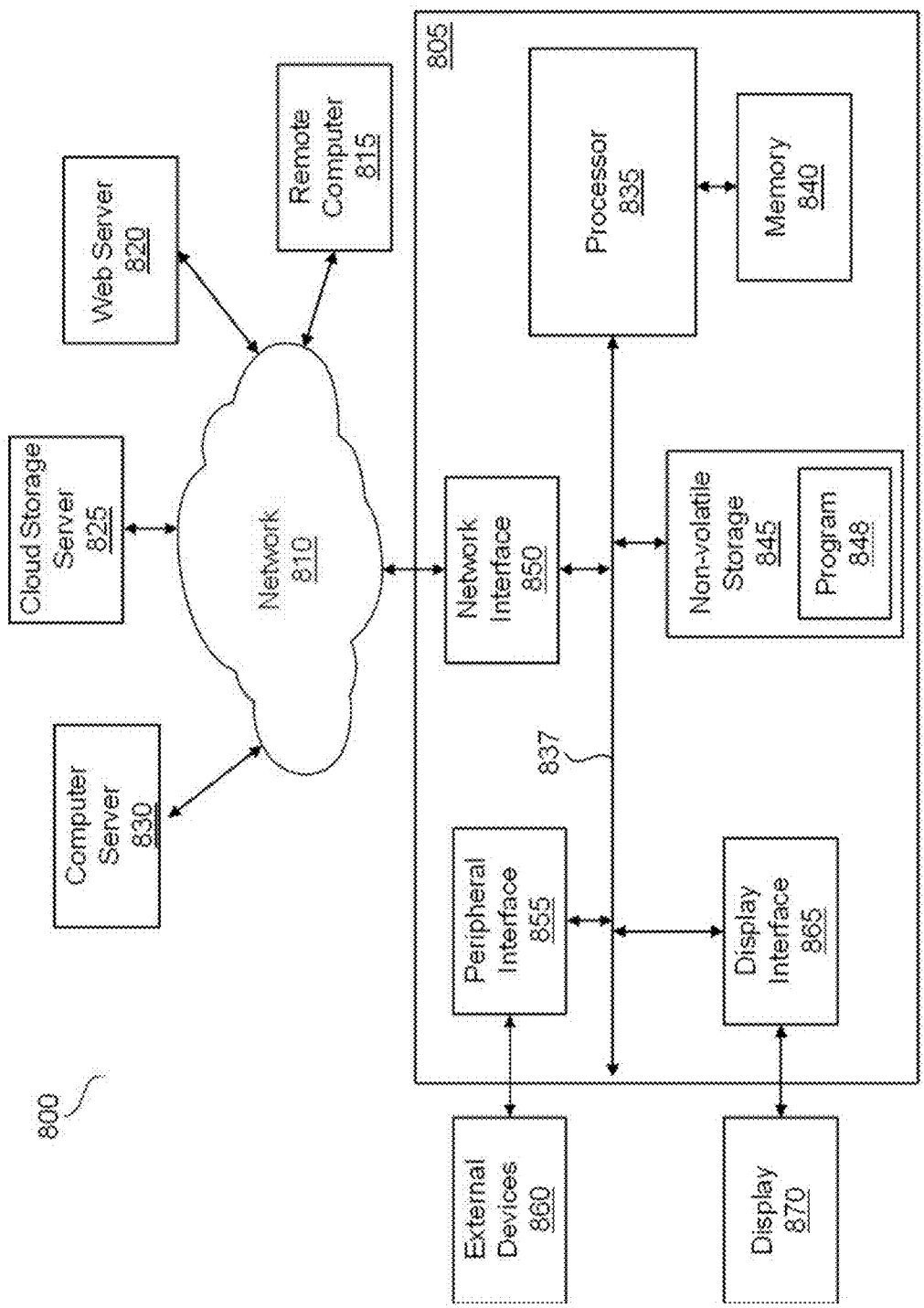
FIG. 7 is a functional block diagram illustrating a networked system of one or more networked electronic devices according to one or more exemplary aspects of the disclosed subject matter.

FIG. 7 illustrates an exemplary hardware block diagram of an electronic device (such as the electronic device 102 or another computer, laptop, tablet, smartphone, server, etc.) that may implement the various embodiments described herein according to one or more aspects of the disclosed subject matter.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C # or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

For example, FIG. 7 is a functional block diagram illustrating a networked system 800 of one or more networked computers and servers. In an embodiment, the hardware and software environment illustrated in FIG. 7 may provide an exemplary platform for implementation of the software and/or methods according to the present disclosure.

Referring to FIG. 7, a networked system 800 may include, but is not limited to, computer 805, network 810, remote computer 815, web server 820, cloud storage server 825 and compute server 830. In some embodiments, multiple instances of one or more of the functional blocks illustrated in FIG. 7 may be employed.

Additional detail of computer 805 is shown in FIG. 7. The functional blocks illustrated within computer 805 are provided only to establish exemplary functionality and are not intended to be exhaustive. And while details are not provided for remote computer 815, web server 820, cloud storage server 825 and compute server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

Figure 9:
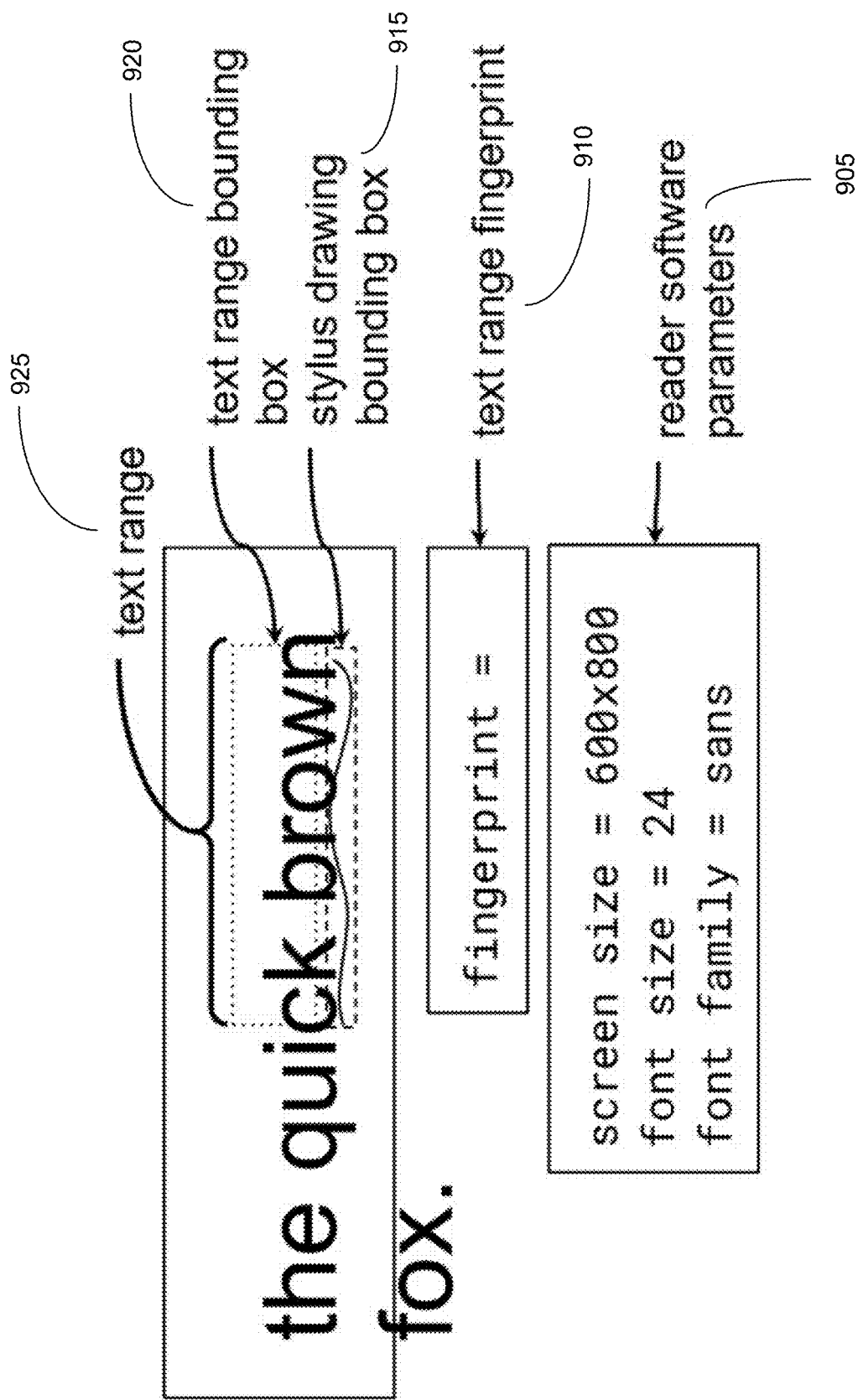
FIG. 9 illustrates associating the annotation with text on a page according to one or more aspects of the disclosed subject matter.

FIG. 9 illustrates associating the annotation with text on a page displayed by the electronic device 102 according to one or more aspects of the disclosed subject matter. For example, after a user has added an annotation overtop of reflowable content, it can be saved as an annotation. In one aspect, saving can be triggered in a number of ways, such as on a timer, when the user turns the page, resizes the page, changes reader software parameters, or when the user explicitly saves the markup (i.e., annotation) through the reader software's user interface. Additionally, the electronic device 102 can be configured to define data that can be be saved alongside the annotation, and the electronic device 102 can use this data to determine how, where, and if to display the annotation. For example, the data can include:
1. All or part of reading software parameters 905. Reading software parameters can include the screen resolution and user configurable parameters such as font size, family, spacing, and justification.
2. The stylus drawing bounding box 915 in the coordinates of the screen when the annotation was originally created.
3. A range of text (e.g., text range 925) which is associated with the annotation. For example, a stylus drawing that underlines the text "brown fox" might have that text associated with the annotation. This is not the same as simply saving the text as a string alongside the annotation. Instead, the position of that text in the eBook is saved. This can be serialized according to the implementation. For example, the byte offset can be saved into the eBook where the text range begins and the byte offset where the text range ends. Another example can be to save positions relative to HTML anchors in an ePub.
4. The text range bounding box 920 in the coordinates of the screen when the annotation was originally created.
5. A text range fingerprint 910.

More specifically, the electronic device 102 (e.g., e-reader 200) can be configured to associate the annotation to the text. First, the annotation can be associated with the text range 925 by clamping the stylus drawing bounding box 915 to the bounding box of the current page (e.g., current page of the e-reader 200). It should be appreciated that the stylus drawing bounding box 915 can be the bounding box of any annotation as described herein and is not limited to only a stylus drawing. The bounding box of the current page can exclude margins and is a bounding box around the content of the page. "Clamped" here means that the vertices of the stylus drawing bounding box 915 are projected to the edges of the page's bounding box if they exceed its bounds. Next, the reader software can determine what text lies between the top-left corner and the bottom-right corner of the bounding box. In one aspect, for vertical-writing content, the top-right and bottom-left vertices are used. If determining the text that lies within the stylus drawing bounding box is successful, then that range is used as the text range 925. If this step is unsuccessful, the width of the stylus drawing bounding box 915 is increased to match the width of the page. This is a temporary change that will not be saved, but it helps associate drawings made in the margins with text in the page. For vertical-writing content, the height of the stylus drawing bounding box 915 is increased to match the height of the page. The e-reader 200 can then be configured to iterate through every sentence, image, and component on the screen and perform the following check: 1) If another object's bounding box intersects with the stylus drawing bounding box 915, it is added to a list. Here this list can be called "intersections." 2) If the object's midpoint is the closest to the midpoint of the stylus drawing bounding box 915 compared to all previously checked objects, it gets saved into a variable. Here the variable will be called "closest." Next, if the "intersections" list is empty, the object in "closest" is added to "intersections." If there were no objects, the result of the algorithm is a failure case and the annotation is not saved. Finally, a minimal range can be found that includes all the objects in the "intersections" list. If the intersections list is already ordered by their position in the page, this can be done by taking the start of the first object in the "intersections" list and the end of the last object in the "intersections" list. This range is saved alongside the annotation.

Figure 10:
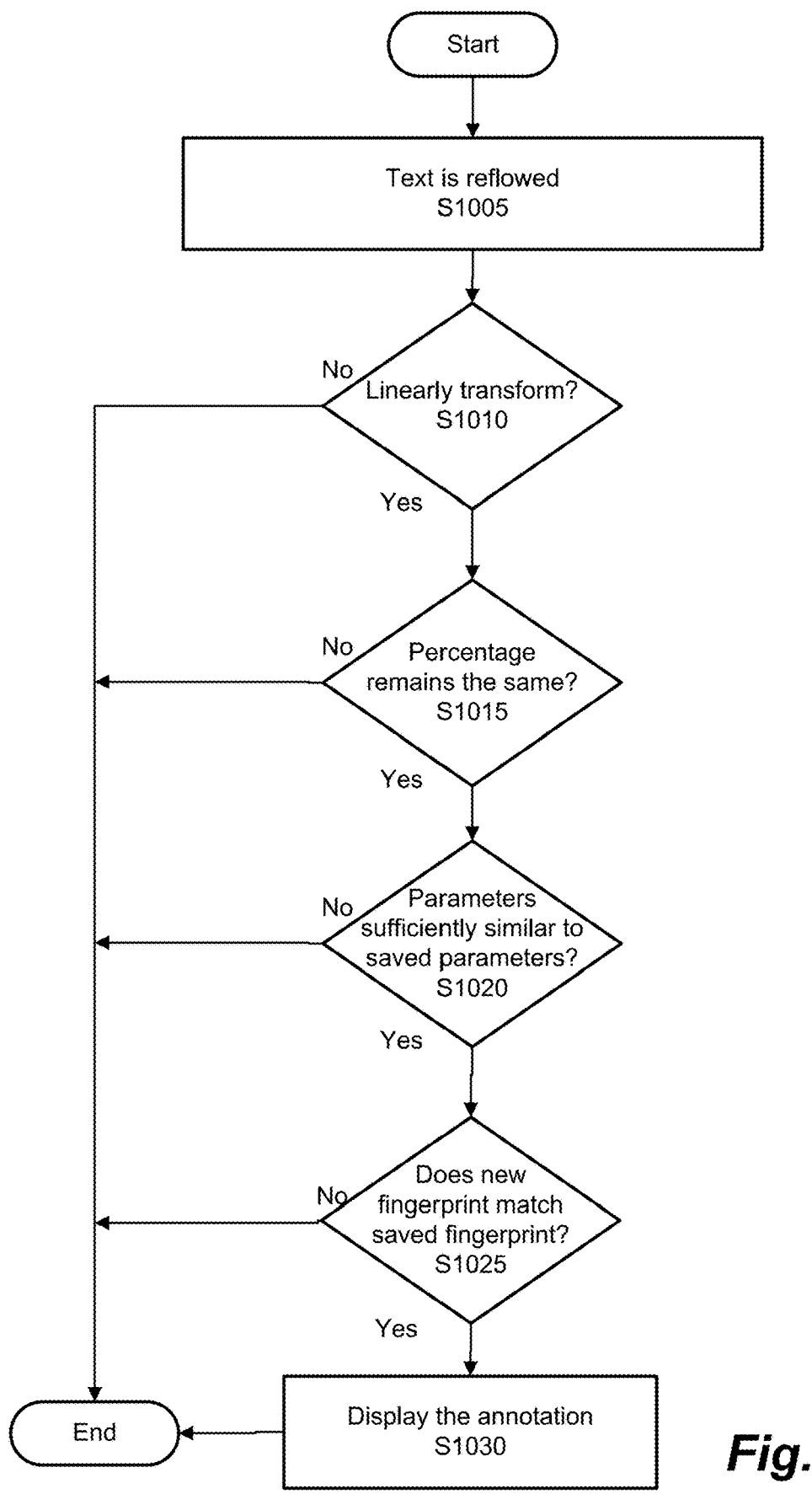
FIG. 10 is an algorithmic flow chart of a method for determining if the annotation can be displayed according to one or more aspect of the disclosed subject matter.

FIG. 10 is an algorithmic flow chart of a method for determining if the annotation can be displayed according to one or more aspect of the disclosed subject matter. In other words, in one aspect, once reflow has been recalculated (e.g., after the user turns the page, changes a reader software parameter, opens a new reading session, etc.), the electronic device 102 must decide if the annotation should be displayed.

In S1005, the text is reflowed. In one aspect, the text can be dynamic content as has been described herein.

In S1010, it can be determined if the annotation will remain on screen if it is linearly transformed to fit over top of the text range it is associated with (e.g., within a predetermined threshold). If no, do not show the annotation. If yes, proceed to S1015.

In S1015, it can be determined if the percentage that the annotation's bounding box area (e.g., stylus bounding box 915) lies in the page margins will be the same as when it was first created (e.g., within a predetermined threshold). If no, do not show the annotation. If yes, proceed to S1020.

In S1020, it can be determined if reading software parameters are sufficiently similar to the saved parameters. For example, if the justification setting is different, the annotation is not displayed. If no, do not show the annotation. If yes, proceed to S1025.

In S1025, it can be determined if the fingerprint for the associated text range matches the one that was saved when the annotation was created. If no, do not show the annotation. If yes, display the annotation in S1030.

After the annotation is displayed in S1030, the process can end. However, it should be appreciated that S1005-S1030 can be repeated for each saved annotation (e.g., annotations that were saved as described with reference to FIG. 9).

Figure 11:
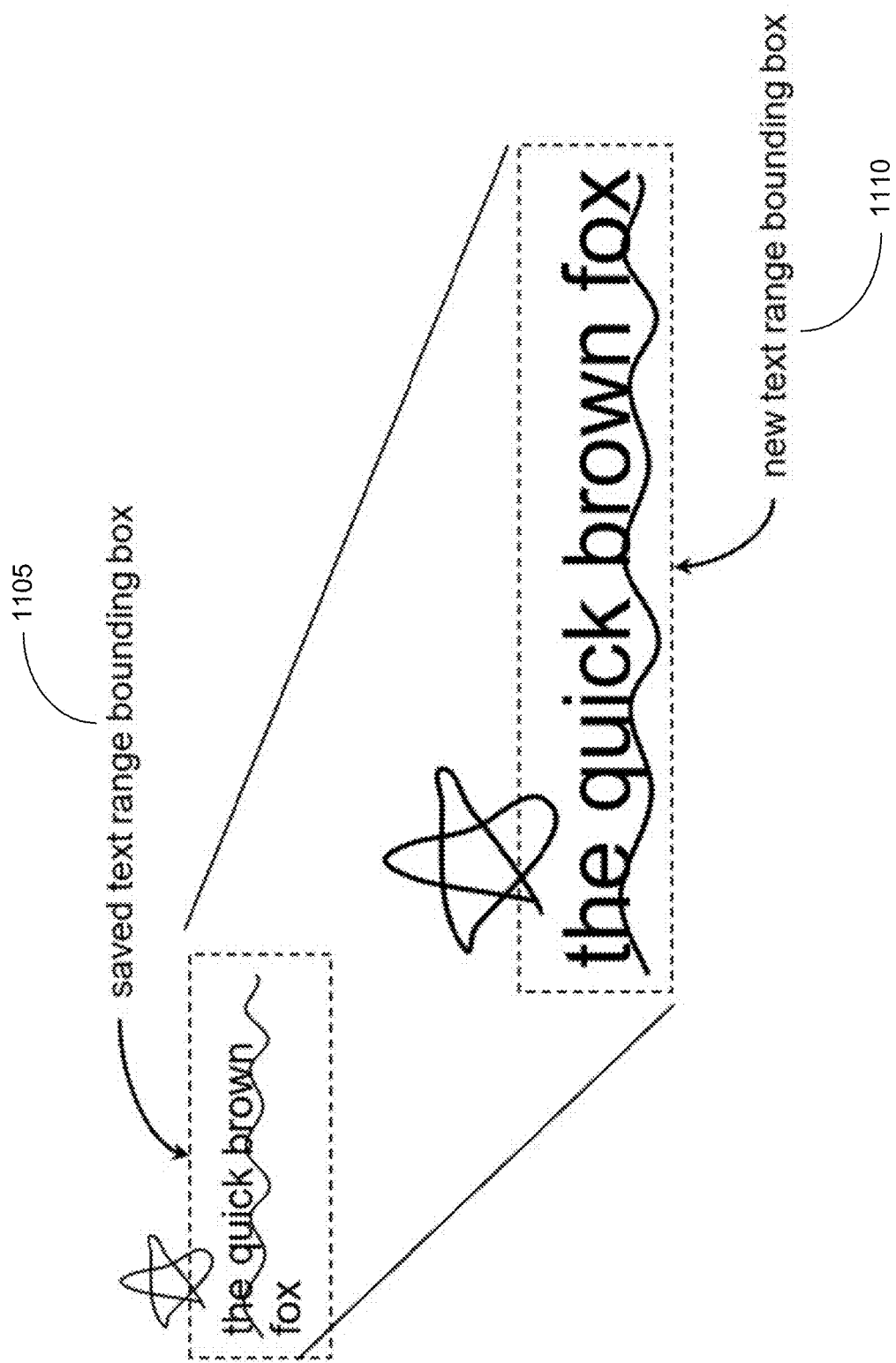
FIG. 11 illustrates a linear transformation that maps a saved bounding box of a text range to a newly calculated bounding box of a text range.

Further, linearly transforming the annotation to fit over top the text range as discussed in S1010 is further described herein with reference to FIG. 11. For example, if the annotation is to be displayed as determined in S1030, the annotation cannot simply be drawn on the screen since the reflow might be different from when the annotation was originally created. For example, the words underneath the markup may have moved to a different location on screen, or the spacing between the words may have changed in a linear fashion. To account for this, the e-reader 200 can be configured to compute a linear transformation that will be applied to the annotation. This linear transformation is one that maps a saved text range bounding box 1105 to a newly calculated text range bounding box 1110. The linear transformation can be performed as follows: 1) translate coordinates so a midpoint of the bounding box 1105 is at origin, 2) scaled coordinates so a height of the bounding box 1105 matches a height of bounding box 1110 and a width of bounding box 1105 matches a width of bounding box 1110, and 3) translate coordinates so the origin is at the midpoint of the bounding box 1110. Applying this linear transformation will map the vertices of bounding box 1105 to the vertices of bounding box 1110. This transformation is used to map the bounding box of the annotation to a new location on screen and the annotation is drawn to the screen to fit this new bounding box.

If it is ultimately decided not to display the markup because one of the cases is false (e.g., no in S1010-S1025), it may instead display a "markup indicator" user interface element in its place. For example, the markup indicator could be implemented as a notification banner on the relevant page where the markup would've been displayed, it could be displayed as a pair of brackets on either side of the page whose height is equal to the height of the text range's bounding box, and the like. In one aspect, the markup indicator can correspond to icon 216 as illustrated in FIG. 2C.

Obviously, numerous modifications and variations of the present invention are possible in light of the above teachings. It is therefore to be understood that within the scope of the appended claims, the invention may be practiced otherwise than as specifically described herein.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto.

Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A method for annotating dynamic content, comprising:
receiving a freeform annotation overlaid on dynamic content of a page, wherein receiving the freeform annotation overlaid on dynamic content further includes
calculating a bounding box of the freeform annotation; and
stretching the bounding box to be equal to a width of the page that displays the dynamic content;
calculating a bounding box for each sentence on the page;
determining whether the stretched bounding box of the freeform annotation intersects one or more of the bounding boxes of the sentences;
in response to a determination that the stretched bounding box of the freeform annotation intersects one or more of the bounding boxes of the sentences, generating a list to include the at least one or more intersecting bounding boxes of the sentences;
generating a cropped image of the dynamic content, wherein the cropped image includes at least the freeform annotation and the at least one or more intersecting bounding boxes of the sentences; and
saving the cropped image and saving an image of the freeform annotation;
determining whether the dynamic content changes; and
in response to a determination that the dynamic content changes, displaying an indicator corresponding to a region on the page where the freeform annotation was created, wherein a selection of the indicator displays the cropped image.

2. The method of claim 1, further comprising:
determining whether the indicator is selected; and
in response to a determination that the indicator is selected, displaying a lightbox with the freeform annotation as it was overlaid on the dynamic content when it was created.

3. The method of claim 2, further comprising:
determining whether a revert button included in the lightbox is selected; and
in response to a determination that the revert button is selected, displaying the freeform annotation overlaid on the dynamic content as it was created before the dynamic content changed.

4. The method of claim 1, wherein displaying an indicator corresponding to a region where the freeform annotation was created includes
in response to the determination that the dynamic content changes, calculating a new bounding box for each of the bounding boxes added to the list; and
placing the indicator based on a union of the new bounding boxes.

5. The method of claim 4, wherein displaying a lightbox with the freeform annotation as it was overlaid on the dynamic content when it was created includes
in response to the user selecting the indicator, superimposing the saved image of the freeform annotation and the saved cropped image; and
displaying the superimposed images as a pop-up.

6. The method of claim 1, further comprising:
in response to the determination that the dynamic content changes, determining whether the annotation will remain on a screen containing the dynamic content if the annotation is linearly transformed to fit over top of the dynamic content it is associated with.

7. An electronic device, comprising:
a processor;
circuitry configured to
receive a freeform annotation overlaid on dynamic content of a page, wherein the circuitry for receiving the freeform annotation overlaid on dynamic content is further configured to
calculate a bounding box of the freeform annotation, and
stretch the bounding box to be equal to a width of the page that displays the dynamic content,
calculate a bounding box for each sentence on the page,
determine whether the stretched bounding box of the freeform annotation intersects one or more of the bounding boxes of the sentences,
in response to a determination that the stretched bounding box of the freeform annotation intersects one or more of the bounding boxes of the sentences, generate a list to include the at least one or more intersecting bounding boxes of the sentences,
generate a cropped image of the dynamic content, wherein the cropped image includes at least the freeform annotation and the at least one or more intersecting bounding boxes of the sentences, and save the cropped image and save an image of the freeform annotation,
determine whether the dynamic content changes, and
in response to a determination that the dynamic content changes, display an indicator corresponding to a region where the freeform annotation was created, wherein a selection of the indicator displays the cropped image.

8. The electronic device of claim 7, wherein the circuitry is further configured to
determine whether the indicator is selected, and
in response to a determination that the indicator is selected, display a lightbox with the freeform annotation as it was overlaid on the dynamic content when it was created.

9. The electronic device of claim 8, wherein the circuitry is further configured to
determine whether a revert button included in the lightbox is selected, and
in response to a determination that the revert button is selected, display the freeform annotation overlaid on the dynamic content as it was created before the dynamic content changed.

10. The electronic device of claim 7, wherein the circuitry for displaying an indicator corresponding to a region where the freeform annotation was created is further configured to
in response to the determination that the dynamic content changes, calculate a new bounding box for each of the bounding boxes added to the list, and
place the indicator based on a union of the new bounding boxes.

11. The electronic device of claim 10, wherein the circuitry for displaying a lightbox with the freeform annotation as it was overlaid on the dynamic content when it was created is further configured to
in response to the user selecting the indicator, superimpose the saved image of the freeform annotation and the saved cropped image, and
display the superimposed images as a pop-up.

12. The electronic device of claim 7, wherein the circuitry is further configured to
in response to the determination that the dynamic content changes, determine whether the annotation will remain on a screen containing the dynamic content if the annotation is linearly transformed to fit over top of the dynamic content it is associated with.

13. An e-reader, comprising:
a processor;
circuitry configured to
receive an annotation overlaid on reflowable text, wherein the circuitry for receiving the annotation overlaid on reflowable text is further configured to
calculate a bounding box of the annotation, and
stretch the bounding box to be equal to a width of a page that displays the reflowable text,
calculate a bounding box for each sentence on the page,
determine whether the stretched bounding box of the annotation intersects one or more of the bounding boxes of the sentences,
in response to a determination that the stretched bounding box of the annotation intersects one or more of the bounding boxes of the sentences, generate a list to include the at least one or more intersecting bounding boxes of the sentences,
generate a cropped image of the reflowable text, wherein the cropped image includes at least the annotation and the at least one or more intersecting bounding boxes of the sentences, and
save the cropped image and save an image of the annotation,
determine whether the reflowable text changes, and
in response to a determination that the reflowable text changes, display an indicator corresponding to a region where the annotation was created, wherein a selection of the indicator displays the cropped image.

14. The e-reader of claim 13, wherein the circuitry is further configured to
determine whether the indicator is selected, and
in response to a determination that the indicator is selected, display a lightbox with the annotation as it was overlaid on the reflowable text when it was created.

15. The e-reader of claim 14, wherein the circuitry is further configured to
determine whether a revert button included in the lightbox is selected, and
in response to a determination that the revert button is selected, display the annotation overlaid on the reflowable text as it was created before the reflowable text changed.

16. The e-reader of claim 13, wherein the circuitry for displaying an indicator corresponding to a region where the annotation was created is further configured to
in response to the determination that the reflowable text changes, calculate a new bounding box for each of the bounding boxes added to the list, and
place the indicator based on a union of the new bounding boxes.

17. The e-reader of claim 16, wherein the circuitry for displaying a lightbox with the annotation as it was overlaid on the dynamic content when it was created is further configured to in response to the user selecting the indicator, superimpose the saved image of the annotation and the saved cropped image, and display the superimposed images as a pop-up.

* * * * *